United States Patent
Bookbinder et al.

(10) Patent No.: US 7,844,154 B2
(45) Date of Patent: Nov. 30, 2010

(54) OPTICAL FIBER FOR OPTICAL POWER TRANSMISSION

(75) Inventors: Dana Craig Bookbinder, Corning, NY (US); Jeffrey Coon, Corning, NY (US); Paulo Clóvis Dainese, Júnior, Painted Post, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 469 days.

(21) Appl. No.: 12/151,051

(22) Filed: May 2, 2008

(65) Prior Publication Data

US 2008/0277565 A1 Nov. 13, 2008

Related U.S. Application Data (60) Provisional application No. 60/927,977, filed on May 7, 2007.

(51) Int. Cl.
*G02B 6/02* (2006.01)
*G01N 23/00* (2006.01)
*C03B 37/023* (2006.01)

(52) U.S. Cl. .............. 385/123; 385/126; 385/127; 65/378; 65/385

(58) Field of Classification Search ......... 385/123, 385/126
See application file for complete search history.

(56) References Cited

U.S. PATENT DOCUMENTS

| | | | |
|---|---|---|---|
| 5,191,206 A | 3/1993 | Boiarski et al. | 250/227.14 |
| 5,802,236 A | 9/1998 | DiGiovanni et al. | 385/127 |
| 6,018,533 A | 1/2000 | Krivoshlykov | 372/6 |
| 6,349,163 B1 | 2/2002 | Antos et al. | 385/127 |

(Continued)

FOREIGN PATENT DOCUMENTS

EP 1336878 A2 8/2003

(Continued)

OTHER PUBLICATIONS

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

(Continued)

*Primary Examiner*—Uyen-Chau N Le
*Assistant Examiner*—Kajli Prince
(74) *Attorney, Agent, or Firm*—Robert L. Carlson (57) ABSTRACT

An optical fiber adapted to carry optical power for powering an electrical device and also optionally adapted to carry optical data for signal processing. The optical fiber capable of carrying both optical data and optical power includes a central data waveguide region that carries data light and an annular power waveguide region concentrically surrounding the data waveguide region and adapted to carry relatively large amounts of optical power. A first annular isolation region between the data and power waveguide regions and that includes microstructures serves to optically isolate the waveguide regions. An outer annular isolation region serves to confine power light to the power waveguide region and contributes to the bend-resistance of the optical fiber. An optical power and optical data distribution system that utilizes the optical fiber is also described.

27 Claims, 6 Drawing Sheets

U.S. PATENT DOCUMENTS

| | | | |
|---|---|---|---|
| 6,614,974 B2 | 9/2003 | Elrefaie et al. | 385/125 |
| 6,671,442 B2 | 12/2003 | Wang et al. | 385/125 |
| 6,687,445 B2 | 2/2004 | Carter et al. | 385/127 |
| 6,766,088 B2 | 7/2004 | Hasegawa et al. | 385/123 |
| 6,773,825 B2 | 8/2004 | Pickrell et al. | 428/566 |
| 6,795,635 B1 | 9/2004 | Fajardo et al. | 385/140 |
| 6,904,215 B2 | 6/2005 | Christoff et al. | 385/124 |
| 7,039,284 B2 | 5/2006 | Nakahara | 385/125 |
| 7,054,513 B2 | 5/2006 | Herz et al. | 385/12 |
| 7,072,552 B2 | 7/2006 | Manyam et al. | 385/125 |
| 7,142,758 B1 | 11/2006 | Herz et al. | 385/125 |
| 7,174,078 B2 | 2/2007 | Libori et al. | 385/125 |
| 7,450,806 B2 | 11/2008 | Bookbinder et al. | 385/125 |
| 7,505,660 B2 | 3/2009 | Bickham et al. | 385/125 |
| 2004/0042748 A1* | 3/2004 | Gruner-Nielsen et al. | 385/127 |
| 2004/0069019 A1 | 4/2004 | Carter et al. | 65/414 |
| 2005/0094954 A1 | 5/2005 | Pickrell et al. | 385/123 |
| 2006/0034574 A1 | 2/2006 | Guan et al. | 385/125 |
| 2008/0124028 A1 | 5/2008 | Bickham et al. | 385/55 |
| 2008/0166094 A1 | 7/2008 | Bookbinder et al. | 385/124 |
| 2009/0032983 A1 | 2/2009 | Bookbinder et al. | 264/1.24 |

FOREIGN PATENT DOCUMENTS

| | | |
|---|---|---|
| EP | 1617243 A1 | 3/2004 |
| EP | 1564569 A1 | 9/2004 |
| WO | WO 99/22257 | 5/1999 |
| WO | WO 01/65731 | 9/2001 |
| WO | WO02/075393 | 9/2002 |
| WO | WO02/102730 | 12/2002 |
| WO | WO 2004/036276 | 4/2004 |
| WO | WO 2004/088377 | 10/2004 |

OTHER PUBLICATIONS

Ellis, "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, Daniel, "Development of Random Hole Optical Fiber and Crucible Technique Optical Fibers", Dissertation submitted to Virginia Polytechnic Institute and State University, Sep. 6, 2005, 142 pp.

Kominsky, D. et al, "Generation of random-hole optical fiber", Optics Letters, Aug. 15, 2003, vol. 23, No. 16, pp. 1409-1411.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, et al, "New possibilities with holey fibers", Optical Fiber Communication Conference, 2000, vol. 3, pp. 106-108.

Pickrell et al, "Fiber Optic Chemical Sensing", SPIE Proceedings, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hold optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

Y Bing et al, "Low-loss Holey Fiber", Hitachi Cable Review No. 24, Aug. 2005, pp. 1-5.

S Matsuo et al, "Bend-Insensitive and Low-Splice-Loss Optical fiber for Indoor Wiring in FTTH", Optical Fiber Communication Conference, 2004, Feb. 23-27, 2004, vol. 2, 3 pgs.

Glaesemann at al; "Mechanical Failure of Bent Optical Fiber Subjected to High Power"; Journal of American Ceramics Society; 89; 50-56 (2006).

Logunov et al; "Effect of Coating Heating by High Power in Optical Fibres at Small Bend Diameters"; Electronics Letters; Jun. 12, 2003; vol. 39; No. 12; p. 897-898.

Miller at al; "High-Power VCSEL Arrays for Emission in the Watt Regime at Room Temperature"; IEEE Photonics Technology Letters; vol. 13, No. 3, Mar. 2001, p. 173-175.

Chua et al; "Independently Addressable VCSEL Arrays on 3-um Pitch"; IEEE Photonics Technology Letters; vol. 10; No. 7, Jul. 1998; p. 917-919.

Francis et al; "Monolithic 2D-VCSEL Array with >2W CW and > 5W Pulsed Output Power"; Electronics Letters; Oct. 29, 1998; vol. 34; No. 22; p. 2132-2133.

* cited by examiner

OPTICAL FIBER FOR OPTICAL POWER TRANSMISSION

CROSS-REFERENCE TO RELATED APPLICATIONS

This application claims the benefit of, and priority of U.S. Provisional Patent Application No. 60/927,977 filed on May 7, 2007, the content of which is relied upon and incorporated herein by reference in its entirety.

BACKGROUND OF THE INVENTION

1. Field of the Invention

The present invention relates generally to optical fibers, and in particular to an optical fiber capable of transmitting optical power or both optical power and optical data.

2. Technical Background

Powering electrical devices (including electronic devices) using copper wires is problematic in certain environments where electrical isolation is required. For example, in high-voltage power distribution lines, the copper wire connecting the ground station to the current-sensing system located at the top of the high-voltage line requires a complex, bulky and heavy isolation system, which is eliminated if the sensor is driven using a fiber system.

Due to its dielectric properties, a fiber optic system is intrinsically insensitive to electric and electromagnetic interference. Accordingly, one alternative to using copper wires to power electrical devices is to use optical fibers instead. An optical-fiber-based power delivery system uses high optical power emitted from a laser source. The laser light is inputted at an input end of the optical fiber, transmitted through the length of the optical fiber, and is converted into electrical power at the output end of the optical fiber. The electrical power is then used to drive one or more electrical devices located at or near the output end of the optical fiber.

Present-day optical-fiber-based power delivery systems use standard telecommunication optical fibers. It would be desirable to have alternative and improved fiber designs for power delivery.

SUMMARY OF THE INVENTION

An aspect of the invention is an optical fiber for optical power transmission. The optical fiber includes an annular power waveguide region adapted to carry power light. The annular power waveguide region has an inner radius of greater than 5 μm, a width greater than 5 μm, and a relative refractive index percent of greater than 1%. Other embodiments of the optical fiber have relative refractive index percentages of greater than 3% and greater than 8%.

Another aspect of the invention is an optical fiber for optical power transmission. The optical fiber includes an inner isolation region comprising glass having microstructures formed therein and having a relative refractive index $\Delta_2$, inner and outer radii $r_1$ and $r_2$ that define an area $A_2 = r_2^2 - r_1^2$, and wherein $-400 \leq \Delta_2 A_2 \leq -20$. The optical fiber also has an annular power waveguide region surrounding the inner isolation region and adapted to carry power light. The optical fiber further includes an outer annular isolation region comprising glass having microstructures formed therein and having a relative refractive index $\Delta_4$, inner and outer radii $r_4$ and $r_5$ that define an area $A_4 = r_5^2 - r_4^2$, and wherein $-6000 \leq \Delta_4 A_4 \leq -100$. The optical fiber also includes a cladding surrounding the outer annular isolation region.

Another aspect of the invention is an optical power distribution system that uses the optical fiber of the present invention. The system includes a power light source optically coupled to the annular power waveguide region at the optical fiber input end and adapted to generate the power light. The system also includes a photovoltaic power converter optically coupled to the annular waveguide region at the optical fiber output end and adapted to receive the power light outputted by the power waveguide region and convert the power light to an electrical power signal.

Another aspect of the invention is a power/data (P/D) optical fiber for optical power and optical data transmission. The optical fiber includes a central data waveguide region adapted to carry data light and an annular power waveguide region concentrically surrounding the central waveguide region and adapted to carry power light. The optical fiber includes an inner isolation region arranged between the central data waveguide region and power waveguide region and that comprises glass having microstructures formed therein and having a relative refractive index $\Delta_2$, inner and outer radii $r_1$ and $r_2$ that define an area $A_2 = r_2^2 - r_1^2$, and wherein $-400 \leq \Delta_2 A_2 \leq -20$. The optical fiber also includes an outer annular isolation region surrounding the annular power waveguide region and that serves to confine the power light to the annular power waveguide region.

Another aspect of the invention is an optical data and power distribution system that uses the P/D optical fiber of the present invention. The system includes a data light source optically coupled to the data waveguide region at the optical fiber input end and adapted to generate the data light, and a power light source optically coupled to the annular power waveguide region at the optical fiber input end and adapted to generate the power light. The system also includes a photodetector optically coupled to the data waveguide region at the optical fiber output end and adapted to detect the data light outputted by the data waveguide region. The system also includes a photovoltaic power converter optically coupled to the annular waveguide at the optical fiber output end and adapted to receive the power light outputted by the power waveguide region and convert the power light to an electrical power signal.

Another aspect of the invention is a method of transmitting optical power light in the optical fiber according to the present invention. The optical fiber has an input end and an output end. The method includes inputting the power light at the input end into an annular power waveguide region defined by inner and outer isolation regions and having an attenuation $\alpha_p$ in the range 0.16 dB/km $\leq \alpha_p \leq$ 50 dB/km. The method also includes outputting the power light at the output end as an annular power light beam.

Another aspect of the invention is a method of transmitting data light and optical power light in the P/D optical fiber according to the present invention, wherein the P/D fiber has an input end and an output end. The method includes, at the input end, inputting the data light into a central data waveguide region and inputting the power light into an annular power waveguide region surrounding the central data waveguide region and optically isolated therefrom. The method also includes, at the output end, outputting the data light at the output end as a central data light beam, and outputting the power light at the output end as an annular power light beam that surrounds the central data light beam.

The optical fibers disclosed herein have a number of advantages over the prior art fibers. For example, the optical fibers of the present invention are designed to carry power at relatively high optical power levels (e.g., greater than 100 W) and so are less prone to light-induced damage. Such fibers are also capable of avoiding damage even when bent into relatively small radii, which is not uncommon when such fibers are deployed in the field. Also, the refractive index profiles of the fibers disclosed herein may optionally be formed without having to resort to using dopants other than airlines dispersed in a glass comprised of silica that add to the attenuation of the fiber, thereby reducing the optical power transmission efficiency. Further, unlike standard telecommunication optical fibers that transmit most of the power in a centrally located waveguide region, the fibers disclosed herein are designed so that the power is transmitted in an annular power waveguide region. The ring-shaped mode associated with the annular power waveguide region corresponds to the most sensitive receiving area of the type of photovoltaic cells used in optical power delivery systems. This allows for improved conversion efficiency i.e., for the same input optical power, more output electrical power is obtained. Further, regular optical fibers have a mode with high intensity in the center, which causes heating of the center of the photovoltaic detector, which in terms limits performance of the optical power delivery system.

Moreover, many electrical devices that utilize electrical power converted from optical power are designed to process and transmit data. As explained below, the fibers disclosed herein include embodiment that carry both high optical power and optical data signals, with the optical power and the optical data signals carried in separate portions of the same optical fiber. This approach reduces cost and simplifies the power delivery system.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numbers and symbols are used throughout the drawings to refer to the same or like parts.

In the discussion below, the "refractive index profile" is the relationship between refractive index or relative refractive index and waveguide fiber radius. The "relative refractive index percent" is defined as $\Delta(\%)=[(n_i^2-n_c^2)/2n_i^2]\times 100$, where $n_i$ is the maximum refractive index in region i, unless otherwise specified, and $n_c$ is the average refractive index of the cladding region, as discussed below. As used herein, the relative refractive index percent is represented by $\Delta(\%)$ and its values are given in units of "%", unless otherwise specified or as is apparent by the context of the discussion. As used herein, "$\Delta(\%)$" refers to relative refractive index percent at a wavelength of 1550 nm.

In the various example design conditions for the optical fiber as specified below, the "relative refractive index" $\Delta_i = [(n_i^2-n_c^2)/2n_i^2]$ is used unless otherwise noted.

In cases where the refractive index of a region is less than the average refractive index of the cladding region, the relative refractive index percent is negative and is referred to as having a "depressed region" or a "depressed index," and is calculated at the point at which the relative refractive index is most negative unless otherwise specified. In cases where the refractive index of a region is greater than the average refractive index of the cladding region, the relative refractive index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

In many of the examples described herein employ a 125 micron diameter optical fiber (unless otherwise stated) because of the preference to comply with the majority standards used in the telecommunication industry. However, the inventive fibers disclosed herein are equally applicable for thinner fiber diameter applications such as less than 100 micron (and even less than 85 micron) diameter applications (e.g., 80 micron diameter fiber is used for fiber optic gyroscopes). With power over fiber applications, industry standards have not yet been decided and implemented and therefore one could also use larger diameter fibers (greater than 150 micron, e.g., 200-500 micron diameter) to carry more power per area. Examples of larger diameter fibers are shown below.

Other techniques to form depressed index regions besides the use of downdopants, such through the use of microstructures, are used in example embodiments of the present invention and are described in greater detail below. Microstructures include, for example, non-periodic and period microvoids or nanostructured features, such as photonic crystals.

The "effective area" is defined as:

$$A_{eff} = 2\pi (\int f^2 \, r \, dr)^2 / (\int f^4 \, r \, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The mode field diameter (MFD) is measured using the Peterman II method wherein, $2w=MFD$, and $w^2 = (2\int f^2 \, r \, dr / \int [df/dr]^2 \, r \, dr)$, the integral limits being 0 to ∞.

The bend resistance of a waveguide fiber can be gauged by induced attenuation under prescribed test conditions, for example by wrapping one or more turns around a cylindrical mandrel having a constant diameter.

The "volume" of a circular cross-section region is defined by its relative refractive index multiplied its "area," wherein the "area" is defined by the square of its radius. Likewise, the volume of an annular cross-section region is defined by its relative refractive index multiplied by its area as defined by $(r_o^2 - r_i^2)$, where $r_o$ is the outer radius and $r_i$ is the inner radius.

In the discussion below, "watts" is abbreviated as "W" and "milliwatts" as "mW".

P/D Optical Fiber

Figure 1:
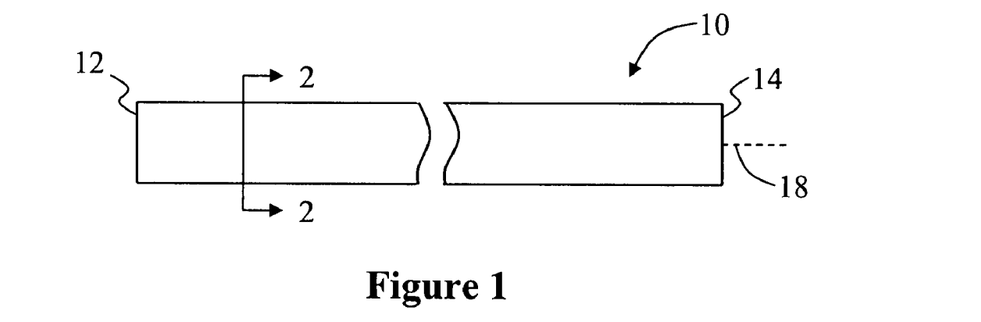
FIG. 1 is a schematic side view of a section of optical fiber according to the present invention.
Figure 2:
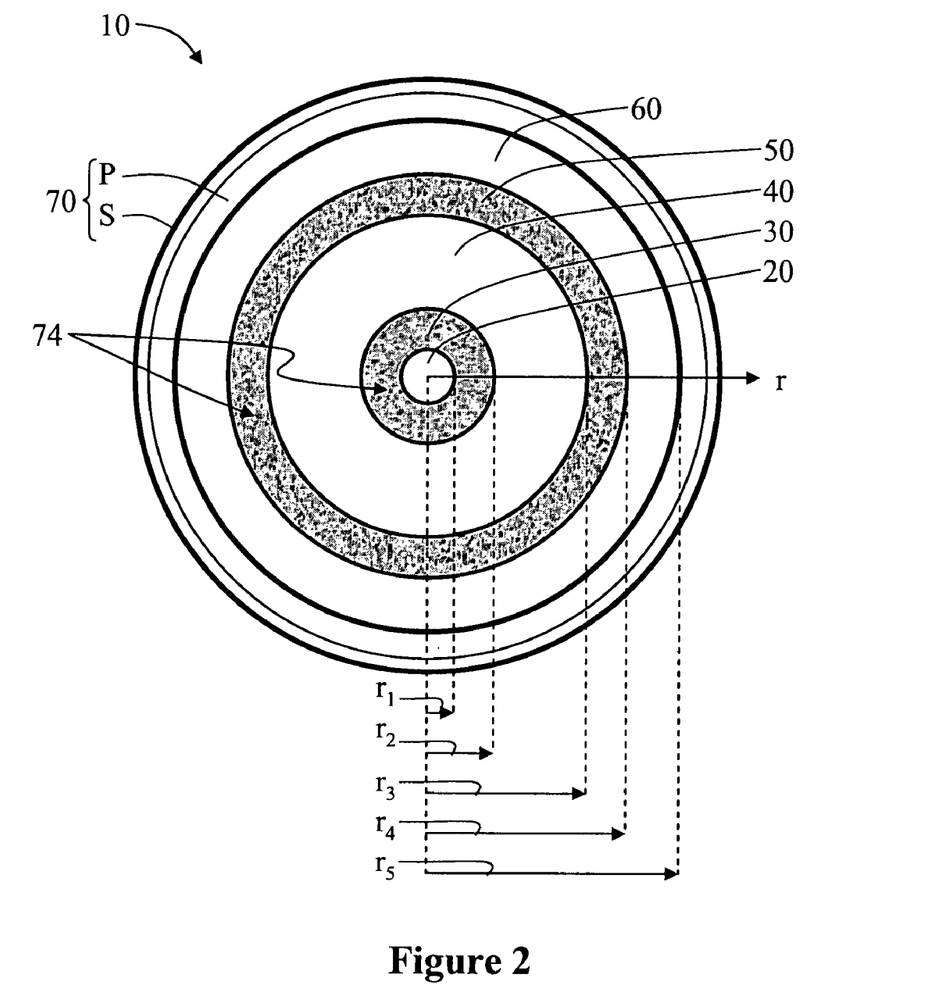
FIG. 2 is a cross-sectional view of the optical fiber of FIG. 1 as taken along the line 2-2 in FIG. 1, illustrating the different regions of an example embodiment of a P/D optical fiber that allows the optical fiber to transmit both optical power and optical data.

FIG. 1 is a schematic side view of an optical fiber 10 according to the present invention. FIG. 2 is a cross-sectional view of an example embodiment of optical fiber 10 as taken along the line 2-2 in FIG. 1 and that is adapted to transmit both optical power and optical data. Such an optical fiber is referred to herein as a "power/data optical fiber," or "P/D optical fiber" for short. FIG. 2 illustrates a generalized structure (i.e., refractive index profile) of P/D optical fiber 10 that enables the P/D optical fiber to carry both optical power and optical data in separate waveguide regions. Example embodiments wherein optical fiber 10 includes only a power-carrying waveguide region are discussed below. Optical fiber 10 is described immediately in connection with the P/D optical fiber example embodiment for the sake of discussion.

In an example embodiment, P/D optical fiber 10 has an input end 12, an output end 14, and a number of different regions or segments-namely, a central core region 20 of refractive index $n_1(r)$ and an outer radius $r_1$ surrounded by a first annular core region 30 having a refractive index $n_2$, an inner radius $r_1$ and an outer radius $r_2$, which in turn is surrounded by second annular core region 40 having a refractive index $n_3(r)$, an inner radius $r_2$ and an outer radius $r_3$. P/D optical fiber 10 also includes a third annular core region 50 having a refractive index $n_4$, an inner radius $r_3$ and an outer radius $r_4$.

In an example embodiment, central core region 20 is comprised of silica doped with germanium, i.e. germania doped silica, and annular region 40 consists of pure silica. Dopants other than germanium, singly or in combination, may be employed within central core region 20, and particularly at or near the centerline of the optical fiber disclosed herein to obtain the desired relative refractive index profiles as discussed below. In preferred embodiments of present invention, central core region 20 and second annular region 40 have a non-negative refractive index profiles, while annular regions 30 and 50 have negative refractive index profiles. In an example embodiment, central core region 20 and annular core region 40 have positive refractive index profiles.

In some preferred embodiments, P/D optical fiber 10 contains no index-decreasing dopants. In other preferred embodiments, P/D optical fiber 10 contains both one or more index-increasing dopants and one or more index-decreasing dopants.

With continuing reference to FIG. 2, annular region 50 is surrounded by an annular cladding region ("cladding") 60 having a refractive index $n_c$, an inner radius $r_4$ and an outer radius $r_5$. In an example embodiment, cladding 60 contains no germania or fluorine dopants therein. In an example embodiment, cladding 60 is pure or substantially pure silica. In another example of embodiment, cladding 60 contains fluorine dopant. Cladding 60 may be comprised of a cladding material which was deposited, for example during a laydown process, or which was provided in the form of a jacketing, such as a tube in a rod-in-tube optical preform arrangement, or a combination of deposited material and a jacket. Cladding 60 may include one or more dopants. In an example embodiment, cladding 60 is immediately surrounded by a coating 70 that includes a primary coating P and a secondary coating S that immediately surrounds the primary coating.

The refractive index $n_c$ of cladding 60 is used to calculate the relative refractive index percent $\Delta(\%)$. Since cladding 60 has a refractive index $n_c$, the relative refractive index percent of the cladding at a cladding radius $r_c$ (where $r_c > r_4$) is given by $\Delta(r_c) = \Delta_5(\%) = 0\%$. In an example embodiment, cladding 60 is immediately surrounded by coating 70.

Figure 3:
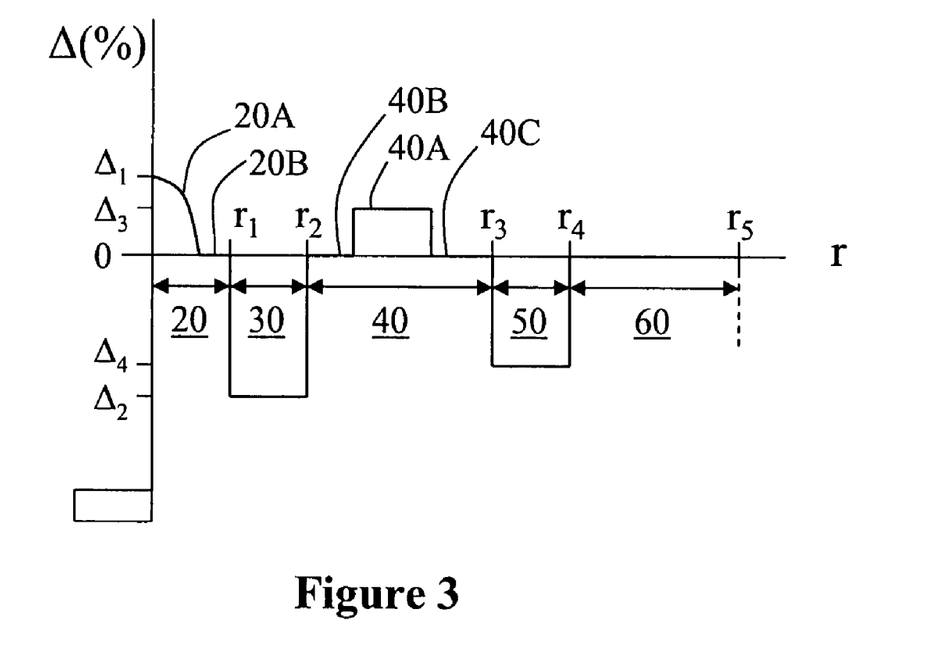
FIG. 3 is a plot of an idealized relative refractive index profile $\Delta(\%)$ as a function of optical fiber radius r associated with the example embodiment of the P/D optical fiber as illustrated in the cross-sectional diagram of FIG. 2.

In the example embodiment illustrated in FIG. 2 and FIG. 3, P/D optical fiber 10 thus includes two concentrically arranged waveguide regions: central core region 20 that is suited as a data channel for carrying relatively low-power optical data signals (e.g., on the order of 10 mW or less, and more typically on the order of 1 mW or less) and annular region 40 suited as a power channel for carrying relatively high optical power (e.g., on the order of 10W or more, and typically greater than a few hundred mW and up to about 100 W or even 1000 Watts) sufficient to power electrical and/or electronic devices that are remote from the source of optical power. Accordingly, in the description hereinbelow, central core region 20 is referred to as the "data waveguide region" and annular region 40 is referred to as the "power waveguide region."

In an example embodiment, annular section 30 has a negative relative refractive index that serves to substantially optically isolate data waveguide region 20 and power waveguide region 40 so that data light carried in the data waveguide region and power light carried in the power waveguide region do not substantially interact. Generally, "optically isolated" means that at most only an insubstantial amount of light ("power light") carried in annular power waveguide region 40 is present in data waveguide region 20. By way of an example described in greater detail below, in an application where light ("data light") carried in data waveguide region 20 is detected by a photodetector, it is undesirable for power light to be present in the data waveguide region in amounts that can interfere with detecting the data light. Thus, an "insubstantial" amount of power light in data waveguide region 20 is that amount of power light that does not significantly interfere with detecting the data light and the subsequent processing of data carried by the data light (e.g., does not increase the bit-error rate or significantly affect the signal-to-noise ratio). In an example embodiment, an insubstantial amount of power light in data waveguide region 20 is less than 10% of the power in the data channel wavelength. Since the amount of light that couples from one waveguide to another is generally a function of the length and proximity of the two waveguides to one another, the amount of optical isolation required between data waveguide region 20 and power waveguide region 40 can be different depending on the length of optical fiber 10 used. Thus, a 1 km section of optical fiber 10 will generally require a greater degree of optical isolation than a 1 m length of optical fiber for a given application.

Also in an example embodiment, annular section 50 has a negative relative refractive index present so that it serves to confine power light to the power waveguide region 40 and thus also serves an isolation function with respect to cladding 60. Accordingly, annular sections 30 and 50 are respectively referred to hereinbelow as inner and outer "isolation regions."

FIG. 3 is a plot of an idealized relative refractive index profile $\Delta(\%)$ as a function of optical fiber radius r associated with the generalized example embodiment of P/D optical fiber 10 according to the present invention as illustrated in the cross-section of FIG. 2. In an example embodiment of optical fiber 10, there is no region inside a radius of 5 µm that has a relative refractive index percent greater than 0.5%.

Data waveguide region 20 generally has a relative refractive index percent $\Delta(\%) \geq 0$, and in the example embodiment of FIG. 3 includes a central sub-section 20A wherein $\Delta_1(\%) > 0$ and an outer sub-section 20B wherein $\Delta_1(\%)=0$. Sub-section 20B serves to further isolate data waveguide region 20 from adjacent inner isolation region 30 so that more data light is carried within the data waveguide region rather in the adjacent annular isolation region as an evanescent wave (field). In an example embodiment for a 125 micron diameter fiber, the width $W_1=2r_1$ of data waveguide region 20 satisfies 3 µm $\leq W_1 \leq$ 65 µm, which includes the width of typical single-mode and multi-mode optical telecommunications optical fiber, i.e., about 3-6 µm for single-mode and 50 to 62.5 µm for multi-mode both types of which are 125 micron diameter fibers.

As discussed above, inner and outer isolation regions 30 and 50 each preferably have negative relative refractive indices $\Delta_2$ and $\Delta_4$. In an example embodiment, $\Delta_2=\Delta_4$. In an example embodiment, inner isolation region 30 and/or outer isolation region 50 is/are made of glass having microstructures formed therein. Generally, the more negative the relative refractive index $\Delta_2$ of inner isolation region 30, the narrower it can be while still providing its optical isolation function. In an example embodiment, $\Delta_2(\%)=-1\%$. Also in an example embodiment, width $W_2=r_2-r_1$ of inner isolation region 30 satisfies 20 µm $\leq W_2 \leq$ 1 µm.

In example embodiments for a 125 micron diameter fiber, inner isolation region 30 has an associated area $A_2=r_2^2-r_1^2$, and in example embodiments satisfies $-400 \leq \Delta_2 A_2 \leq -20$, more preferably satisfies $-200 \leq \Delta_2 A_2 \leq -20$, and most preferably satisfies $-200 \leq \Delta_2 A_2 \leq -30$.

The width $W_4=r_4-r_3$ of outer isolation region 50 can be very large because its size is only limited in practice by the desired overall diameter of optical fiber 10. In an example embodiment for a 125 micron diameter fiber, $W_4$ satisfies 10 µm $\leq W_4 \leq$ 50 µm. Like inner isolation region 30, the more negative the relative refractive index $\Delta_4$ of outer isolation region 50, the narrower it can be while still providing its optical isolation function. In an example embodiment, $\Delta_4(\%)=-1\%$. As with inner isolation region 30, outer isolation region 50 has an associated area $A_4=r_4^2-r_3^2$, and in an example embodiment satisfies $-6000 \leq \Delta_4 A_4 \leq -100$. A 250 micron diameter fiber would scale accordingly such that outer isolation region 50 has an associated area $A_2=r_4^2-r_3^2$, and in one example embodiment satisfies $-12000 \leq \Delta_4 A_4 \leq -200$. That is, volume, $\Delta_4 A_4$, at a constant width and constant delta scales with fiber diameter. A four fold volume for 50 would occur with a 500 micron diameter fiber (500/125), that is, in example embodiment satisfies $-24000 \leq \Delta_4 A_4 \leq -400$.

Example methods of forming inner and outer isolation regions 30 and 50 are discussed in detail below.

Power waveguide region 40 generally has a relative refractive index percent $\Delta_3(\%) \geq 0$. In an example embodiment, power waveguide region 40 has an inner radius $r_2$ of greater than 5 µm, a width $W_2=r_3-r_2$ of greater than 5 µm, and a relative refractive index percent $\Delta_3(\%)$ of greater than or equal to 1%. In two other example embodiments, power waveguide region 40 has a relative refractive index $\Delta_3(\%)$ of greater than 3% and of greater than 8%, respectively. In yet another example embodiment, power waveguide region 40 is capable of propagating (carrying) at least 5 modes at 850 nm.

The example embodiment of optical fiber 10 as illustrated in FIG. 3 shows power waveguide region 40 having a central sub-section 40A wherein $\Delta_4(\%)>0$ and outer sub-sections 40B and 40C that surround the central sub-section wherein $\Delta_4(\%)=0$. Sub-sections 40B and 40C serve to enhance the isolation of power waveguide region 40 from the adjacent inner and outer isolation regions 30 and 50 so that more power light is carried within the power waveguide region rather than in the adjacent annular isolation regions as an evanescent wave. In an example embodiment of optical fiber 10 where the optical fiber carries a given amount of optical power, power waveguide region 40 is capable of carrying greater than 90% of the total amount of optical power.

Because optical fiber 10 is adapted to carry large amounts of optical power (i.e., "high" optical power) in power waveguide region 40, this waveguide region is provided with a relatively large area so that the power density (i.e., the intensity I=power/area) is kept below the light-damage threshold. Accordingly, in an example embodiment for a 125 micron optical fiber, the width $W_3=r_3-r_2$ of power waveguide region 40 satisfies 1 µm $\leq W_3 \leq$ 42.5 µm. For example, $W_1$ and $W_4$ may be 5 and 10 microns, respectively. For a 250 micron diameter fiber where the inner and outer isolation regions, $W_1$ and $W_4$ may be held at 5 and 10 microns, respectively, the power waveguide region 40 can have an associated width $W_3=r_3-r_2$ of power waveguide region 40 larger than that achieved with a 125 micron diameter fiber and satisfies 42.5

μm≦$W_3$≦110 μm. A 500 micron diameter fiber allows one to make the ring power waveguide even larger when $W_1$ and $W_4$ held at 5 and 10 microns.

In an example embodiment, power waveguide region 40 preferably has an attenuation $\alpha_p$ in the range 0.16 dB/km≦$\alpha_p$≦50 dB/km so that as little power light as possible is lost due to attenuation.

In a specific example embodiment, power waveguide region 40 has dimensions corresponding to those of a vertical cavity surface-emitting laser (VCSEL) light source, as described below in connection with FIG. 8. Further, power waveguide region 40 preferably has a numerical aperture (NA) greater than that associated with the VCSEL light source.

Forming the Optical Fiber

In example embodiments, some or all of the different regions that make up P/D optical fiber 10 as disclosed herein are made by a vapor deposition process. Even more preferably, fabrication of some or all of P/D optical fiber 10 includes using an outside vapor deposition (OVD) process. Thus, for example, known OVD laydown, consolidation, and draw techniques may be advantageously used to produce the optical fiber disclosed herein. Other processes, such as modified chemical vapor deposition (MCVD) or vapor axial deposition (VAD) or plasma chemical vapor deposition (PCVD) may be used, either alone or in combination with any other deposition process. Thus, the refractive indices and the cross sectional profile of the optical fibers disclosed herein can be accomplished using manufacturing techniques known to those skilled in the art including, but in no way limited to, OVD, VAD and MCVD processes.

Inner and outer isolation regions 30 and 50 need to be sufficiently deep and/or wide to provide optical isolation between light traveling in data waveguide region 20 and power waveguide region 40. Further, one or both of these annular isolation regions are preferably formed in a manner that increases the bend-resistance of P/D optical fiber 10. As discussed above, different approaches can be used to form inner and outer isolation regions 30 and 50, such as via the formation of microstructures (also called "nanostructured features"), via fluorine doping, or via the formation of periodic nanostructured features that run the length of the optical fiber and that are referred to in the art as "photonic crystals." Example approaches for forming photonic crystals in the inner and/or outer isolation regions of the present invention are described in U.S. Pat. Nos. 6,243,522 and 6,445,862, which patents are incorporated by reference herein.

Thus, in an example embodiment of P/D optical fiber 10, at least one of inner and outer isolation regions 30 and 50 comprises glass having formed therein non-periodically disposed holes (voids) 74. In an example embodiment, the glass is fluorine-doped while in another example embodiment the glass is undoped pure silica. By "non-periodically disposed" or "non-periodic distribution," it is meant that when one takes a cross-section of the optical fiber (such as shown in FIG. 2), the non-periodically disposed holes are randomly or non-periodically distributed across a portion of the fiber. Cross sections similar to FIG. 2 taken at different points along the length of P/D optical fiber 10 will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend the entire length of the entire fiber for typical lengths of transmission fiber. While not wishing to be bound by theory, it is believed that the holes extend less than a few meters, and in many cases less than 1 meter along the length of the fiber.

If non-periodically disposed holes or voids 74 are employed in at least one of the inner and outer isolation regions 30 and 50, it is desirable that they be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

In an example embodiment, holes 74 can contain one or more gases, such as argon, nitrogen, or oxygen, or the holes can contain a vacuum with substantially no gas; regardless of the presence or absence of any gas, the refractive index of the hole-containing region is lowered due to the presence of the holes. The holes can be randomly or non-periodically disposed, while in other embodiments the holes are disposed periodically. In some embodiments, the plurality of holes comprises a plurality of non-periodically disposed holes and a plurality of periodically disposed holes. Alternatively, or in addition, as mentioned above the depressed index can also be provided by downdoping the glass in the hole-containing region (such as with fluorine) or updoping one or both of the surrounding regions.

One or both of inner and outer isolation regions 30 and 50 can be made by methods that utilize preform consolidation conditions, which are effective to trap a significant amount of gases in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose endpoints are disposed on the silica internal surface defining the hole when the optical fiber is viewed in perpendicular cross-section transverse to the optical fiber central axis.

The use and/or formation of microstructured regions in optical fiber is described more fully in U.S. Pat. No. 6,243,522, pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; 60/841,490 filed Aug. 31, 2006; and 60/879,164, filed Jan. 08, 2007, all of which are assigned to Corning Incorporated and all of which are incorporated by reference herein.

Power Optical Fiber

Figure 4:
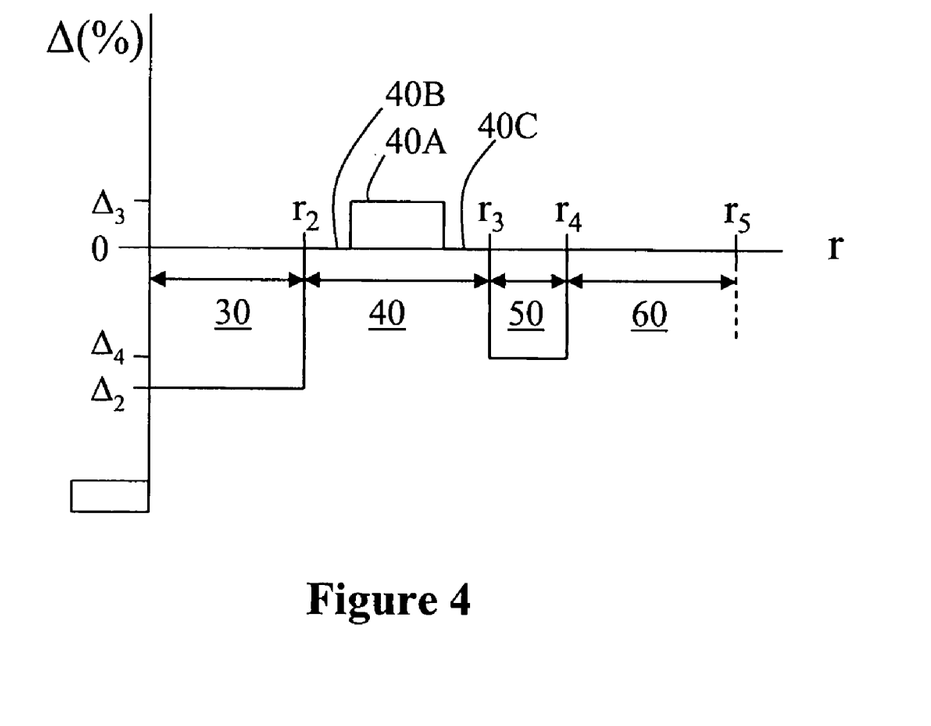
FIG. 4 is a plot similar to that of FIG. 3 illustrating an example embodiment of the optical fiber of the present invention that carries optical power but not optical data.
Figure 5:
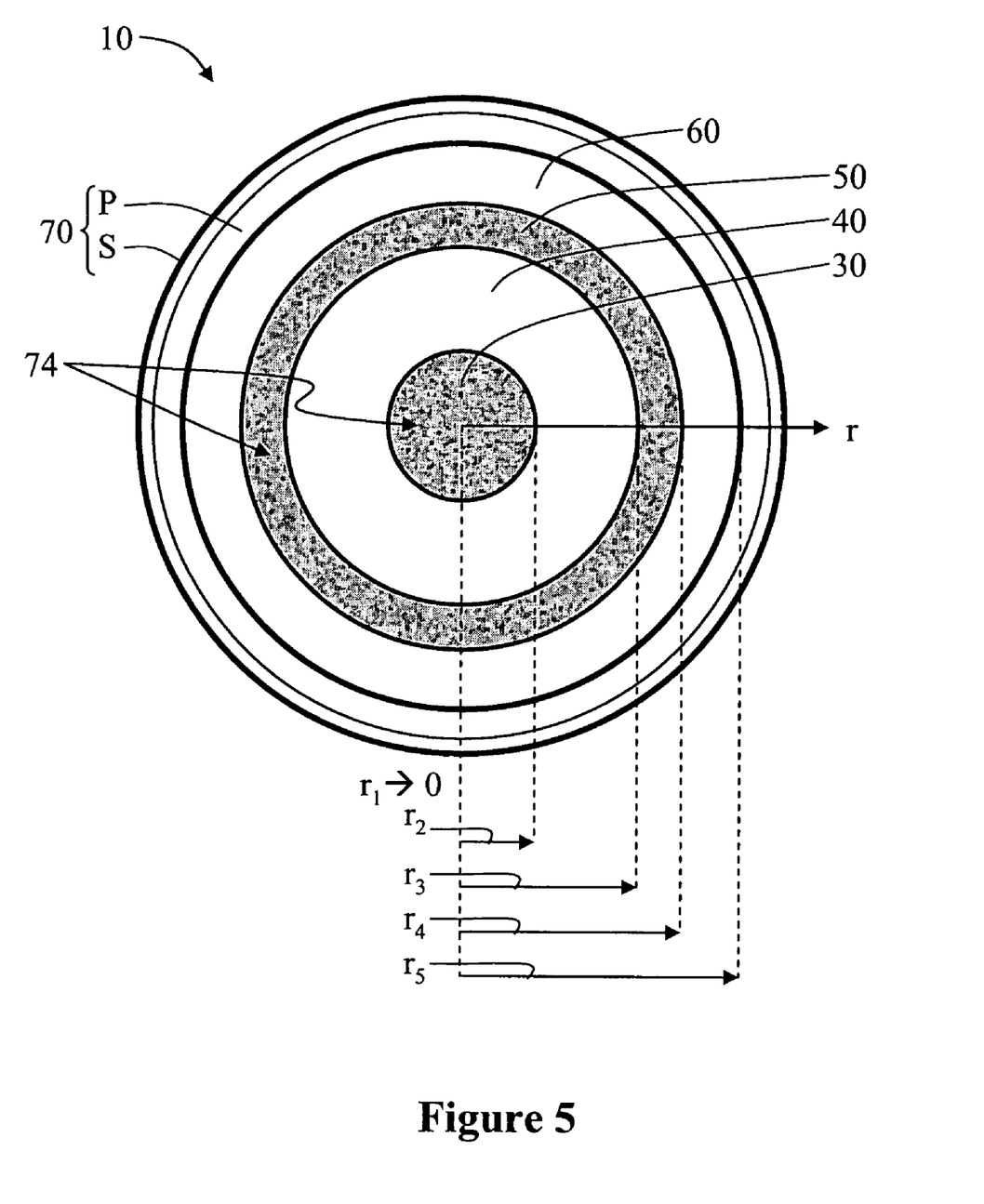
FIG. 5 is a cross-sectional schematic diagram similar to FIG. 2 illustrating the different regions of the optical fiber associated with the refractive index profile of FIG. 4.

An example embodiment of optical fiber 10 of the present invention is similar to the above-described P/D optical fiber but is configured so that it only delivers optical power and is thus referred to herein as a "power optical fiber." FIG. 4 is a plot similar to FIG. 3 illustrating an example embodiment of power optical fiber 10 that does not include data waveguide region 20. FIG. 5 is a schematic cross-sectional diagram similar to FIG. 2 illustrating a generalized structure (i.e., refractive index profile) of power optical fiber 10 according to FIG. 4 that enables the power optical fiber to carry optical power (power light) in annular power waveguide region 30. For the sake of consistency, the same reference numbers and radii are used as for the related embodiments of P/D optical fiber 10. What was once an inner annular isolation region 30 with an inner radius $r_1$ and outer radius $r_2$ is now simply a central isolation region with an outer radius $r_2$ ($r_1 \rightarrow 0$) that serves to confine power light to annular power waveguide region 40.

Optical Power and Optical Data Distribution System

Figure 6:
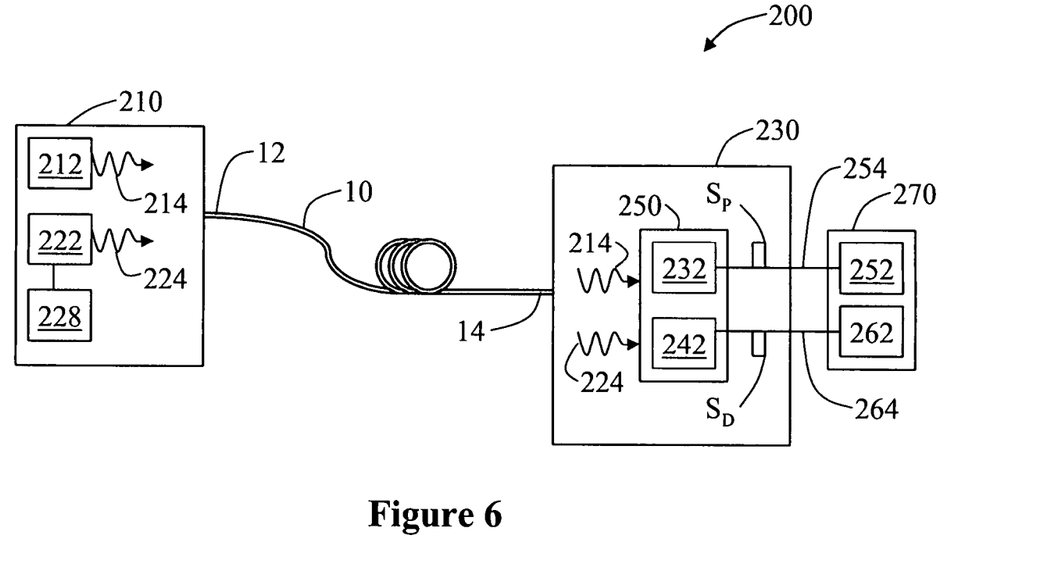
FIG. 6 is a schematic diagram of an example embodiment of an optical power and optical data distribution system according to the present invention that uses the P/D optical fiber of the present invention.

FIG. 6 is an example embodiment of an optical power and optical data distribution system 200 ("P/D system") according to the present invention that uses P/D optical fiber 10. P/D system 200 includes a light source unit 210 that has a power light source 212 adapted to generate light 214 that serves as optical power ("power light") and a data light source 222 adapted to generate light 224 that carries data ("data light"). Light source unit 210 is optically coupled to input end 12 of P/D optical fiber 10 section in a manner that optically couples data light 224 into data waveguide region 20 and that optically couples power light 214 into power waveguide region 40. In an example embodiment, data light source 222 is operably coupled to a modulation circuit 228 that modulates the data light so that it carries information.

P/D system 200 includes an optical-to-electrical (O/E) converter unit 230 optically coupled to P/D optical fiber output end 14. O/E converter unit 230 includes a photovoltaic power converter 232 adapted to receive power light 214 on a light-detecting surface of area $A_{232}$ (FIG. 9) and convert the received power light into electrical power signal $S_P$. O/E converter unit 230 also includes a photodetector 242 adapted to receive data light 224 on a light-detecting surface of area $A_{242}$ (FIG. 9) and convert the detected data light into an electrical data signal $S_D$. In an example embodiment, photovoltaic power converter 232 and photodetector 242 constitute a detector unit 250. O/E converter unit 230 is electrically connected to at least one electrical device 252 via an electrical link 254 that carries electrical power signal $S_P$ that powers the at least one electrical device. Likewise, O/E converter unit 230 is electrically connected to at least one signal processing unit ("signal processor") 262 via an electrical link 264 that carries electrical data signal $S_D$ to be processed by the at least one signal processing unit. In an example embodiment, electrical device 252 and signal processor 262 are part of a single electrical unit 270.

Figure 7:
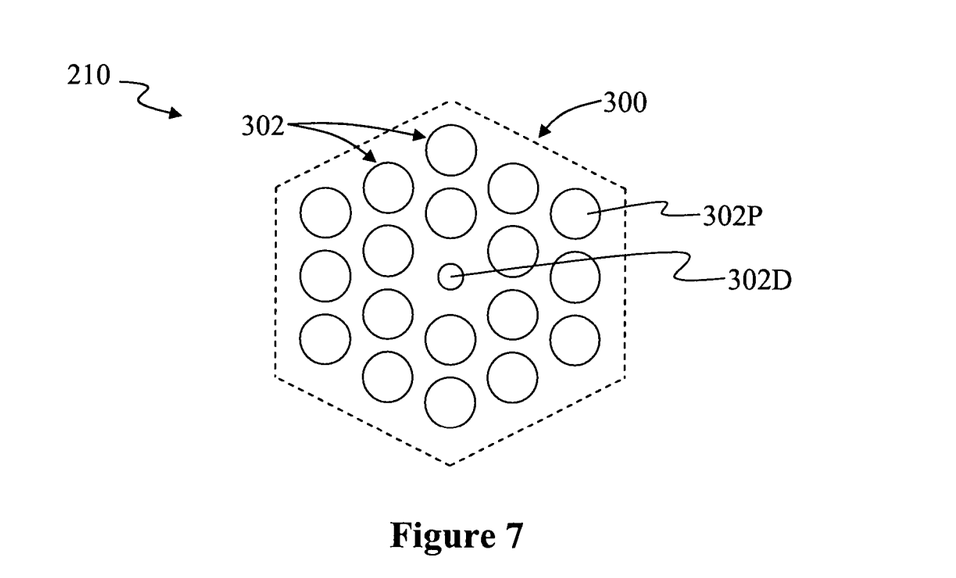
FIG. 7 is a schematic plan view of an example embodiment of a VCSEL-based light source unit that facilitates optical coupling of power light into the annular power waveguide region and data light into the central data waveguide region.

Because power waveguide region 40 is annular and surrounds central data waveguide region 20, power and data light sources 212 and 222 are preferably configured to facilitate optical coupling of power light 214 and data light 224 into these respective waveguide regions. FIG. 7 is a schematic plan view of an example embodiment of light source unit 210 that facilitates such optical coupling. Light source 210 of FIG. 7 includes an array 300 of a number of individual light-emitting elements 302. In an example embodiment, each of light-emitting elements 302 are or otherwise include VCSELS, with one or more centrally located light-emitting elements 302D serving to generate data light 224 and one or more light-emitting elements 302P serving to generate power light 214.

Figure 8:
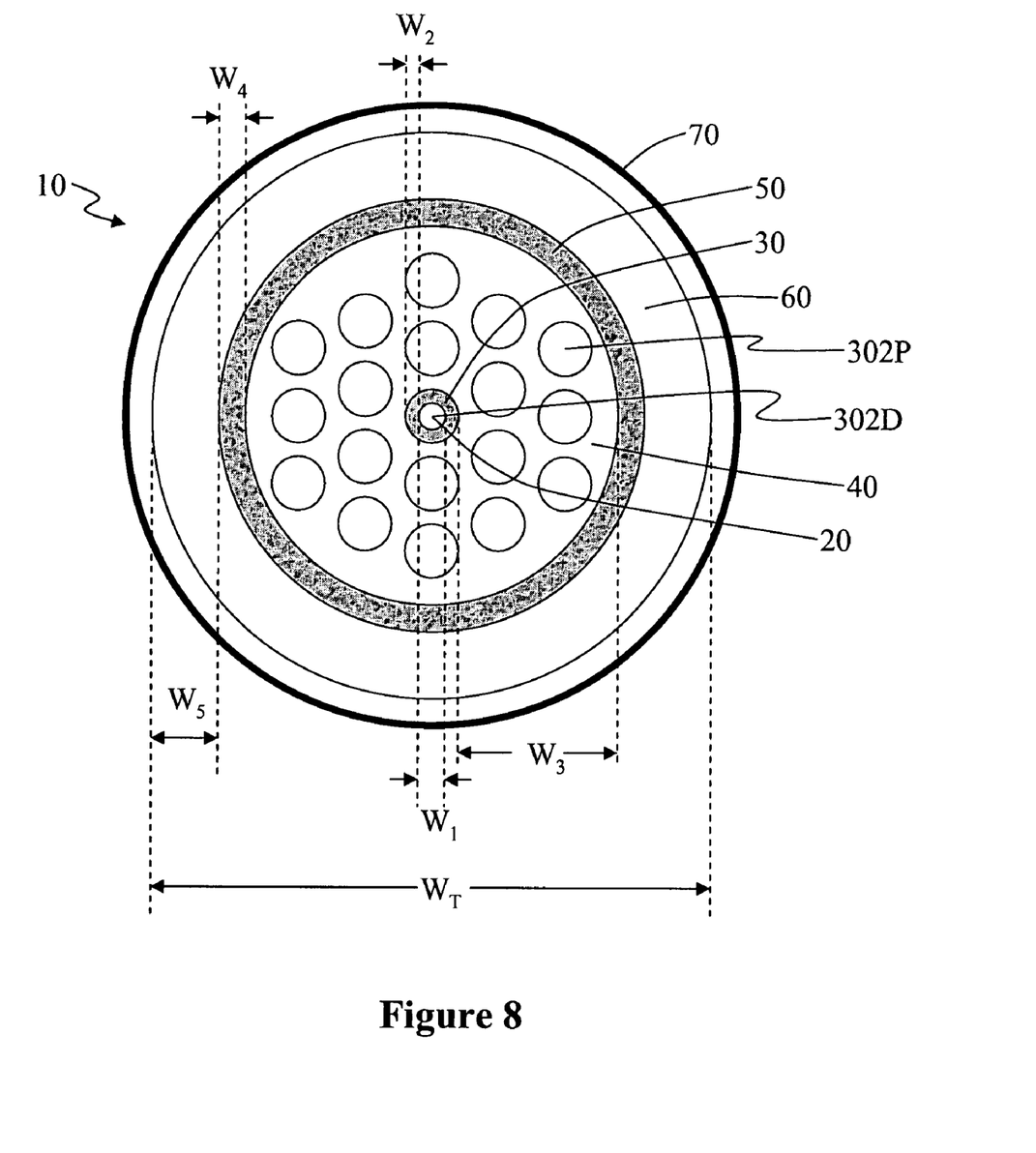
FIG. 8 is a schematic diagram of the various optical fiber sections superimposed on the light source unit of FIG. 7, illustrating a preferred correspondence between the light-emitting elements and the data and power waveguide sections.

FIG. 8 is a schematic diagram of the various optical fiber sections superimposed on light source unit 210 of FIG. 7 to illustrate an example light source configuration wherein there is correspondence between the data and power light-emitting elements 302D and 302P and the associated data and power waveguide regions 20 and 40 of P/D optical fiber 10. FIG. 8 illustrates an example embodiment wherein array 300 of light-emitting elements is configured to provide optimum optical coupling of power light 214 and data light 224 into the power and data waveguide regions 40 and 20, respectively. In an example embodiment, $W_1=4$ μm, $W_2=10$ μm, $W_3=33.5$ μm, $W_4=5$ μm, and $W_5=10$ μm, which dimensions yield a total width $W_T=125$ μm. This relatively large optical fiber width $W_T$ makes P/D optical fiber 10 relatively simple and easy to align to power and data light sources 214 and 224.

Note also that in the embodiment illustrated in FIG. 8, a width $W_3=33.5$ μm of power waveguide region 40 corresponds to a mode area of approximately 6,500 μm$^2$.

Figure 9:
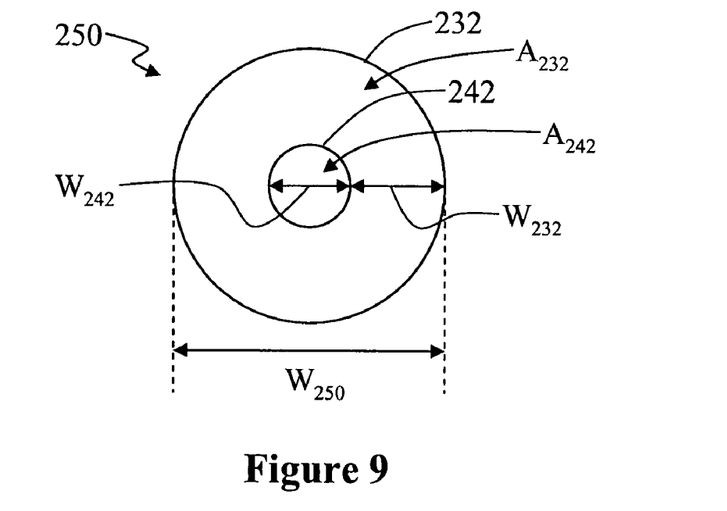
FIG. 9 is a schematic front-on view of an example embodiment of a detector unit of the O/E converter unit of the optical power and optical data distribution system of FIG. 6, wherein the photodetector and photovoltaic power converter are concentrically arranged.

FIG. 9 is a schematic front-on view of an example embodiment of detector unit 250 of O/E converter unit 230, wherein photodetector 242 and photovoltaic power converter 232 of O/E converter 230 are arranged concentrically, with the photodetector in the center and the photovoltaic power converter in the form of an annulus. In an example embodiment, a central portion of photovoltaic power converter 232 is removed to form an aperture and photodetector 242 is arranged either within the aperture, or behind the aperture so that light reaches the photodetector through the aperture.

Figure 10:
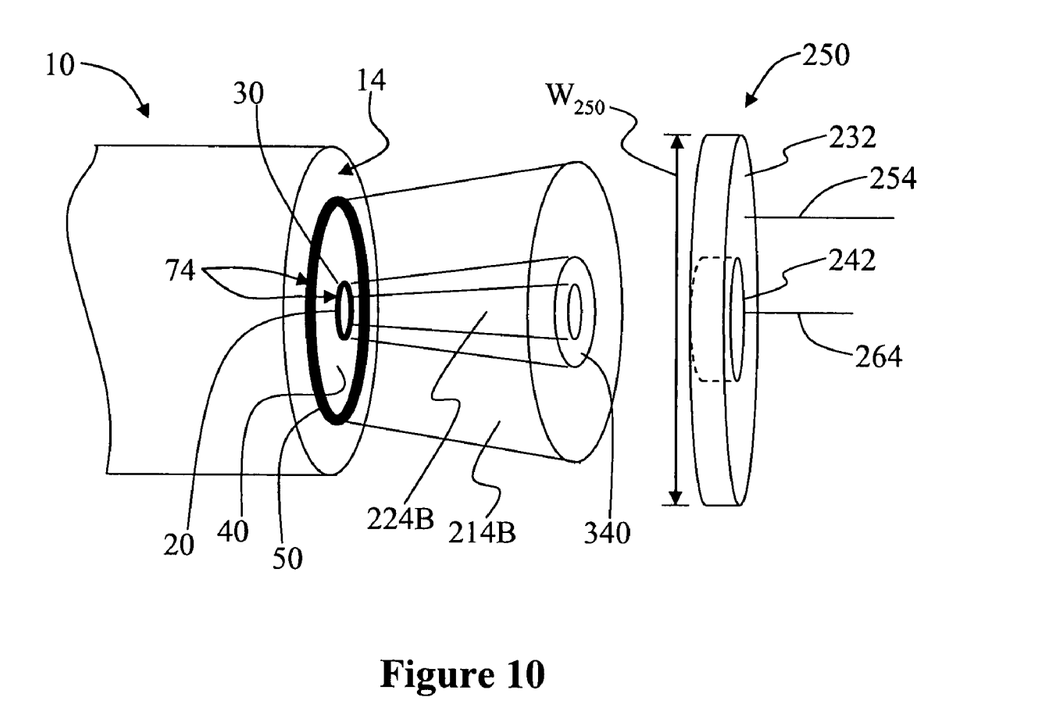
FIG. 10 is a schematic perspective diagram of an example embodiment of the detector unit of FIG. 9 shown operatively arranged relative to the output end of the P/D optical fiber of the present invention so that the data light beam and the power light beam are respectively incident upon the entirety of the detection areas of the photodetector and the photovoltaic power converter.

It is generally preferred when detecting light using a detector that all or substantially all of the detection area be used. FIG. 10 is a schematic perspective diagram of an example embodiment of detector unit 250 of FIG. 9 shown positioned relative to output end 14 of P/D optical fiber 10 so that data light 224 and power light 214 are respectively incident on photodetector 242 and photovoltaic power converter 232 in a manner that substantially covers the entirety of the associated detection areas $A_{242}$ and $A_{232}$.

When light source 210 in P/D system 200 is activated, P/D optical fiber output end 14 outputs from data waveguide region 20 a data light beam 224B of data light 224 and also outputs from power waveguide region 40 a power light beam 214B of power light 214. Because inner isolation region 30 separates data waveguide region 20 and power waveguide region 40, there is an annular dark region or "gap" 340 between the corresponding data and power light beams 224B and 214B. Gap 340 is advantageous in that it prevents the spillover of power light 214 and data light 224 between the different detectors. Because of the numerical apertures $NA_{20}$ and $NA_{40}$ associated with data waveguide region 20 and power waveguide region 40, respectively, the corresponding data and power light beams 224B and 214B diverge. This allows for detector unit 250 to be larger than the output end 14 of P/D optical fiber 10, e.g., $W_{250} 32 \ 2W_{10}$, and otherwise sized appropriately to facilitate receiving the power and data light beams.

In an example embodiment of the above-described system 200, optical fiber 10 is the power optical fiber described above in connection with FIG. 4 and FIG. 5. Because power optical fiber 10 only carries optical power, light source unit 210 need only include power light-emitting elements 302P and detector unit 250 only need include photovoltaic power converter 232.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber for optical power transmission, comprising:
   an inner isolation region comprising glass having microstructures formed therein and having a relative refractive index $\Delta_2$, inner and outer radii $r_1$ and $r_2$ that define an area $A_2 = r_2^2 - r_1^2$, wherein $r_1$ and $r_2$ are measured in micrometers and wherein $-400 \leq \Delta_2 A_2 \leq -20$;
   an annular power waveguide region surrounding the inner isolation region and adapted to carry power light;
   an outer annular isolation region comprising glass having microstructures formed therein and having a relative refractive index $\Delta_4$, inner and outer radii $r_3$ and $r_4$ that define an area $A_4 = r_4^2 - r_3^2$, wherein $r_3$ and $r_4$ are measured in micrometers and wherein $-6000 \leq \Delta_4 A_4 \leq -100$; and
   a cladding surrounding the outer annular isolation region.

2. The optical fiber of claim 1, wherein the inner isolation region is annular and further including:
   a central data waveguide region immediately surrounded by the annular inner isolation region and adapted to carry data light, and wherein the annular inner isolation region substantially optically isolates the central data waveguide region from the power waveguide region.

3. The optical fiber of claim 2, wherein the microstructures of the inner and outer annular isolation regions include at least one of: photonic crystals, non-periodically disposed holes, periodically disposed holes.

4. An optical data and power distribution system, comprising:
   the optical fiber of claim 2 having an input end and an output end;
   a data light source optically coupled to the data waveguide region at the optical fiber input end and adapted to generate the data light;
   a power light source optically coupled to the annular power waveguide region at the optical fiber input end and adapted to generate the power light;
   a photodetector optically coupled to the data waveguide region at the optical fiber output end and adapted to detect the data light outputted by the data waveguide region; and
   a photovoltaic power converter optically coupled to the annular power waveguide region at the optical fiber output end and adapted to receive the power light outputted by the annular power waveguide region and convert the power light to an electrical power signal.

5. The system of claim 4, wherein the data and power light sources are concentrically arranged to correspond to the associated data and power waveguide regions.

6. The optical fiber of claim 1, wherein the power waveguide region has an attenuation $\alpha_p$ in the range $0.16$ dB/km $\leq \alpha_p \leq 50$ dB/km.

7. An optical power distribution system, comprising:
   the optical fiber of claim 1 having an input end and an output end;
   a power light source optically coupled to the annular power waveguide region at the optical fiber input end and adapted to generate the power light; and
   a photovoltaic power converter optically coupled to the annular power waveguide region at the optical fiber output end and adapted to receive the power light outputted by the annular power waveguide region and convert the power light to an electrical power signal.

8. A method of transmitting optical power light in an optical fiber in accordance with claim 1 having an input end and an output end, comprising:
   inputting the power light at the input end into the annular power waveguide region defined by the inner isolation region and the outer annular isolation region, said power waveguide region having an attenuation $\alpha_p$ in the range $0.16$ dB/km $\leq \alpha_p \leq 50$ dB/km; and
   outputting the power light at the output end as an annular power light beam.

9. The method of claim 8, wherein the inner isolation region is annular and further including:
   inputting at the input end data light into a central data waveguide region immediately surrounded by the inner annular isolation region so as to be optically isolated from the power waveguide region; and
   outputting the data light at the output end as a central data light beam concentrically surrounded by the annular power light beam.

10. The method of claim 8, wherein at least one of the inner and outer isolation regions includes at least one of: non-periodically disposed holes, photonic crystals and fluorine dopants.

11. The method of claim 8, wherein the annular power light beam has an output optical power of at least 1 W.

12. An optical fiber for optical power and optical data transmission, comprising:
   a central data waveguide region adapted to carry data light and having a relative refractive index $\Delta_1$;
   an annular power waveguide region having a refractive index $\Delta_3$, said annular power waveguide region concentrically surrounding the central waveguide region and adapted to carry power light;
   an inner isolation region arranged between the central data waveguide region and the annular power waveguide region and comprising glass having microstructures formed therein and having a relative refractive index $\Delta_2$, inner and outer radii $r_1$ and $r_2$ that define an area $A_2 = r_2^2 - r_1^2$, wherein $r_1$ and $r_2$ are measured in micrometers, and wherein $-400 \leq \Delta_2 A_2 \leq -20$; and
   an outer annular isolation region surrounding the annular power waveguide region and that serves to confine the power light to the annular power waveguide region and wherein the optical fiber satisfies at least one of the following conditions:
   a) the central data waveguide region has a central section with $\Delta_1 > 0$ and an outer section with $\Delta_1 = 0$; and
   b) the annular power waveguide region has a central section with $\Delta_3 > 0$ and surrounding outer sections with $\Delta_3 = 0$.

13. The optical fiber of claim 12, wherein the inner annular isolation region and/or the outer annular isolation region include(s) at least one of: photonic crystals, non-periodically disposed holes, periodically disposed holes, and fluorine dopants.

14. The optical fiber of claim 12, wherein said relative refractive index ($\Delta_3$(%)) is greater than 3%.

15. The optical fiber of claim 14, said relative refractive index ($\Delta_3$(%)) is greater than 8%.

16. The optical fiber of claim 12, wherein said annular power waveguide region is capable of propagating at least 5 modes at 850 nm.

17. The optical fiber of claim 12, wherein the power waveguide region has an attenuation $\alpha_p$ in the range $0.16$ dB/km $\leq \alpha_p \leq 50$ dB/km.

18. An optical power and optical data distribution system, comprising:
- the optical fiber of claim 12 having an input end and an output end;
- a data light source optically coupled to the central data waveguide region at the optical fiber input end and adapted to generate the data light;
- a power light source optically coupled to the annular power waveguide region at the optical fiber input end and adapted to generate the power light;
- a photodetector optically coupled to the central data waveguide region at the optical fiber output end and adapted to detect the data light outputted by the central data waveguide region; and
- a photovoltaic power converter optically coupled to the annular power waveguide region at the optical fiber output end and adapted to receive the power light outputted by the annular waveguide and convert the power light to an electrical power signal.

19. The system of claim 18, wherein the photodetector and photovoltaic power converter are concentrically arranged so as to operatively correspond to the associated central waveguide and annular waveguide.

20. The system of claim 18, wherein the photodetector and the photovoltaic power converter have respective detection areas, and wherein the photodetector and photovoltaic power converter are positioned relative to the optical fiber output end so that the data light and power light respectively cover substantially the entirety of the respective detection areas.

21. The system of claim 18, wherein the data and power light sources are concentrically arranged to be operably associated with the central and annular waveguides.

22. The system of claim 18, wherein the power light source and/or the data light source include(s) at least one vertical-cavity surface-emitting laser (VCSEL).

23. A method of transmitting data light and optical power light in an optical fiber in accordance with claim 12 having an input end and an output end, comprising:
a) at the input end:
- inputting the data light into the central data waveguide region;
- inputting the power light into the annular power waveguide region surrounding the central data waveguide region and optically isolated therefrom;

b) at the output end:
- outputting the data light at the output end as a central data light beam; and
- outputting the power light at the output end as an annular power light beam that surrounds the central data light beam.

24. The method of claim 23, further including:
- converting the data light to an electrical data signal and providing the electrical data signal to a signal processor; and
- converting the power light to an electrical power signal and providing the electrical power signal to at least one electrical device so as to power the at least one electrical device.

25. The method of claim 24, wherein converting the data light into an electrical data signal and converting the power light to electrical power signal further includes detecting the data light and power light with a photodetector and a photovoltaic power converter concentrically arranged so as to be operably associated with the central and annular waveguides.

26. The method of claim 23, further including generating the data light and power light using a concentric arrangement of a central data light source and an annular power light source that are respectively optically coupled to the central data waveguide region and the annular power waveguide region.

27. The method of claim 23, wherein the data waveguide region and the annular power waveguide region are isolated by the first annular isolation region, and the first annular isolation region includes at least one of: photonic crystals, non-periodically disposed holes, periodically disposed holes, and fluorine dopants.

* * * * *